(12) United States Patent
Gingrich

(10) Patent No.: US 8,096,045 B2
(45) Date of Patent: Jan. 17, 2012

(54) DEVICE AND METHOD FOR MANUFACTURING WHEEL BEARING ASSEMBLY

(75) Inventor: John R. Gingrich, Farmington, MI (US)

(73) Assignee: Il Jin Global Co., Ltd., Samsung-Dong, Kangnam-Gu, Seoul (KR)

( * ) Notice: Subject to any disclaimer, the term of this patent is extended or adjusted under 35 U.S.C. 154(b) by 605 days.

(21) Appl. No.: 12/316,871

(22) Filed: Dec. 17, 2008

(65) Prior Publication Data

US 2010/0146790 A1 Jun. 17, 2010

(51) Int. Cl.
*B21D 39/00* (2006.01)
*B21D 53/10* (2006.01)

(52) U.S. Cl. ......... 29/724; 29/725; 29/898; 29/898.062; 29/898.07; 29/522.1

(58) Field of Classification Search .............. 29/509, 29/522.1, 523, 724, 725, 898, 898.04, 898.061, 29/898.062, 898.066, 898.07; 384/544
See application file for complete search history.

(56) References Cited

U.S. PATENT DOCUMENTS

| | | | | |
|---|---|---|---|---|
| 6,105,251 | A * | 8/2000 | Payen | 29/898.066 |
| 6,363,799 | B1 * | 4/2002 | Toda et al. | 73/862.49 |
| 6,398,419 | B1 * | 6/2002 | Kashiwagi et al. | 384/537 |
| 6,832,854 | B2 * | 12/2004 | Umekawa et al. | 384/544 |
| 7,891,879 | B2 * | 2/2011 | Hirai et al. | 384/544 |
| 2003/0177641 | A1 * | 9/2003 | Gavard et al. | 29/898 |
| 2005/0018937 | A1 * | 1/2005 | Lagorgette | 384/428 |
| 2007/0227004 | A1 * | 10/2007 | Tsuzaki et al. | 29/898 |
| 2011/0061238 | A1 * | 3/2011 | Sera et al. | 29/898.04 |

\* cited by examiner

*Primary Examiner* — Alexander P Taousakis
(74) *Attorney, Agent, or Firm* — Lexyoume IP Group, PLLC

(57) ABSTRACT

The present invention relates to device and method for manufacturing a wheel bearing assembly that reduces an error rate by reducing stress concentrated on rolling elements in manufacturing processes of the wheel bearing assembly. The device for manufacturing a wheel bearing assembly may include: a base, on which a hub is mounted, supporting the hub in a case of orbital-forming; a forming tool mounting portion mounted above the base; a rotating portion rotatably connected to an outer ring and rotating or pivoting the outer ring about a hub axis in a case of the orbital-forming; and a forming tool mounted at the forming tool mounting portion, rotating on a first axis slanted to the hub axis by a predetermined angle, and simultaneously orbiting about a second axis parallel with the hub axis.

8 Claims, 4 Drawing Sheets

DEVICE AND METHOD FOR MANUFACTURING WHEEL BEARING ASSEMBLY

BACKGROUND OF THE INVENTION (a) Field of the Invention

The present invention relates to device and method for manufacturing a wheel bearing assembly. More particularly, the present invention relates to device and method for manufacturing a wheel bearing assembly that reduces an error rate by reducing stress concentrated on rolling elements in manufacturing processes of the wheel bearing assembly.

(b) Description of the Related Art

Generally, a wheel bearing assembly rotatably connects a wheel to a vehicle body and enables a vehicle to move. Such a wheel bearing assembly is divided largely into a driving wheel bearing assembly that transmits torque generated in an engine and a driven wheel bearing assembly that does not transmit torque.

The driving wheel bearing assembly includes a rotatable element that is rotatably connected to a driving shaft that is rotated by the torque generated in the engine and transmitted from a transmission so as to rotate together with the driving shaft, and a non-rotatable element fixed to the vehicle body. Rolling elements are interposed between the rotatable element and the non-rotatable element. The rotatable element of the driven wheel bearing assembly is not connected to the driving shaft, but other components of the driven wheel bearing assembly are the same as those of the driving wheel bearing assembly.

For stable performance, the wheel bearing assembly is manufactured such that a preload is applied to the rolling elements. An orbital-forming method is mainly used for applying preload to the rolling elements.

A conventional orbital-forming method will be briefly explained.

Firstly, a first row of rolling elements is inserted on the rotatable element of the wheel bearing assembly (hereinafter referred to as a "hub"), and an outer ring is mounted such that the first row of the rolling elements is contacted with first inner and outer raceways. After that, a second row of rolling elements is inserted on the second outer raceway and an inner ring where a second inner raceway is formed is press-fitted to the hub. At this time, an end portion of the hub is protruded from the inner ring in an axial direction thereof.

At this state, the wheel bearing assembly is located such that the end portion of the hub faces upwards, and the hub and the outer ring are fixed to a base so as to not move.

After that, the end portion of the hub is pressed downwardly by a forming tool that is slanted with respect to a hub axis (that represents a central axis of the wheel bearing assembly) at a predetermined angle and rotates about the hub axis. In this case, the end portion of the hub undergoes plastic deformation and is deformed radially outwardly toward the hub. At this time, the inner ring applies a preload to the rolling elements and is axially fixed.

However, since a difference of rotational speed between the forming tool and the hub is large according to the conventional orbital-forming method, the forming tool imparts a large impact on the end portion of the hub the moment that the forming tool contacts the hub. Particularly, since the end portion of the hub has a thinner thickness compared with other parts of the hub, the end portion may be broken by such a large impact.

In addition, stress is concentrated on the rolling elements as a consequence of impact that the forming tool imparts to the hub. However, since the outer ring is fixed according to the conventional orbital-forming method, such stress concentration on the rolling elements cannot be reduced.

Such stress concentration on the rolling elements increases an error rate of the wheel bearing assembly.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device and method for manufacturing a wheel bearing assembly having advantages of reducing an error rate by reducing stress concentrated on rolling elements in manufacturing processes of the wheel bearing assembly.

In addition, the present invention has been made in an effort to provide a device and method for manufacturing a wheel bearing assembly having further advantages of decreasing an impact occurring in a manufacture process of the wheel bearing assembly as a consequence of a hub being guided to have a predetermined movement in an initial state of orbital-forming.

A device for manufacturing a wheel bearing assembly, which has a hub provided with one end engaged to a wheel of a vehicle and the other end forming a stepped portion and an end portion, an inner ring mounted on the stepped portion of the hub, an outer ring mounted at a vehicle body, and rolling elements interposed between the outer ring and the hub and the inner ring, may orbitally-form the end portion of the hub radially outwardly toward the inner ring, according to an exemplary embodiment of the present invention.

The device for manufacturing a wheel bearing assembly may include: a base, on which the hub is mounted, supporting the hub in a case of orbital-forming; a forming tool mounting portion mounted above the base; a rotating portion rotatably connected to the outer ring and rotating or pivoting the outer ring about a hub axis in a case of the orbital-forming; and a forming tool mounted at the forming tool mounting portion, rotating on a first axis slanted to the hub axis by a predetermined angle, and simultaneously orbiting about a second axis parallel with the hub axis.

The forming tool may have a cylindrical shape, and a central axis of the forming tool may be the same as the first axis.

A forming groove may be formed at a lower end of the forming tool, wherein the forming groove contacts the end portion of the hub in a case of the orbital-forming so as to form the end portion of the hub radially outwardly toward the inner ring.

The hub may be provided with a flange protruded radially outwardly from one end of the hub and a bolt hole bored on the flange and engaging the wheel of the vehicle with the hub, the base may be provided with a guiding hollow corresponding to the bolt hole, and a guiding pin may be inserted in the bolt hole and the guiding hollow and guide the hub to have a predetermined movement in a case of the orbital-forming so as to reduce stress concentrated on the rolling elements.

The predetermined movement of the hub may be caused by rotation of the guiding pin in the bolt hole.

The predetermined movement of the hub may be upward or downward reciprocal motion of the hub within a predetermined range.

In a case that the hub moves upwardly or downwardly, the forming tool may also move upwardly or downwardly.

The rotating portion may include: a driving unit generating torque; a rotatable plate connected to and rotated by the driving unit; and a driving link eccentrically connected to the rotatable plate, and rotatably connected to the rotatable plate and the outer ring so as to rotate or pivot the outer ring about the hub axis according to rotation of the rotatable plate.

In a method for manufacturing a wheel bearing assembly that has a hub provided with one end engaged to a wheel of a vehicle and the other end forming a stepped portion and an end portion, an inner ring mounted on the stepped portion of the hub, an outer ring mounted at a vehicle body, and rolling elements interposed between the outer ring and the hub and the inner ring, a forming tool may rotate and contact the end portion of the hub so as to orbitally-form the end portion of the hub radially outwardly toward the inner ring, according to another exemplary embodiment of the present invention.

According to the method for manufacturing a wheel bearing assembly, the forming tool is contacted to the end portion of the hub, the outer ring is rotated or pivoted about a hub axis in a case of orbital-forming, and the end portion of the hub is orbitally-formed radially outwardly toward the inner ring by rotating the forming tool on a first axis slanted to the hub axis by a predetermined angle and simultaneously orbiting the forming tool about a second axis parallel with the hub axis.

The hub may be guided to have a predetermined movement in a case of the orbital-forming so as to reduce stress concentrated on the rolling elements.

Rotation speed of the outer ring may be slower than rotating speed and orbiting speed of the forming tool.

DETAILED DESCRIPTION OF THE EMBODIMENTS

An exemplary embodiment of the present invention will hereinafter be described in detail with reference to the accompanying drawings.

Figure 1:
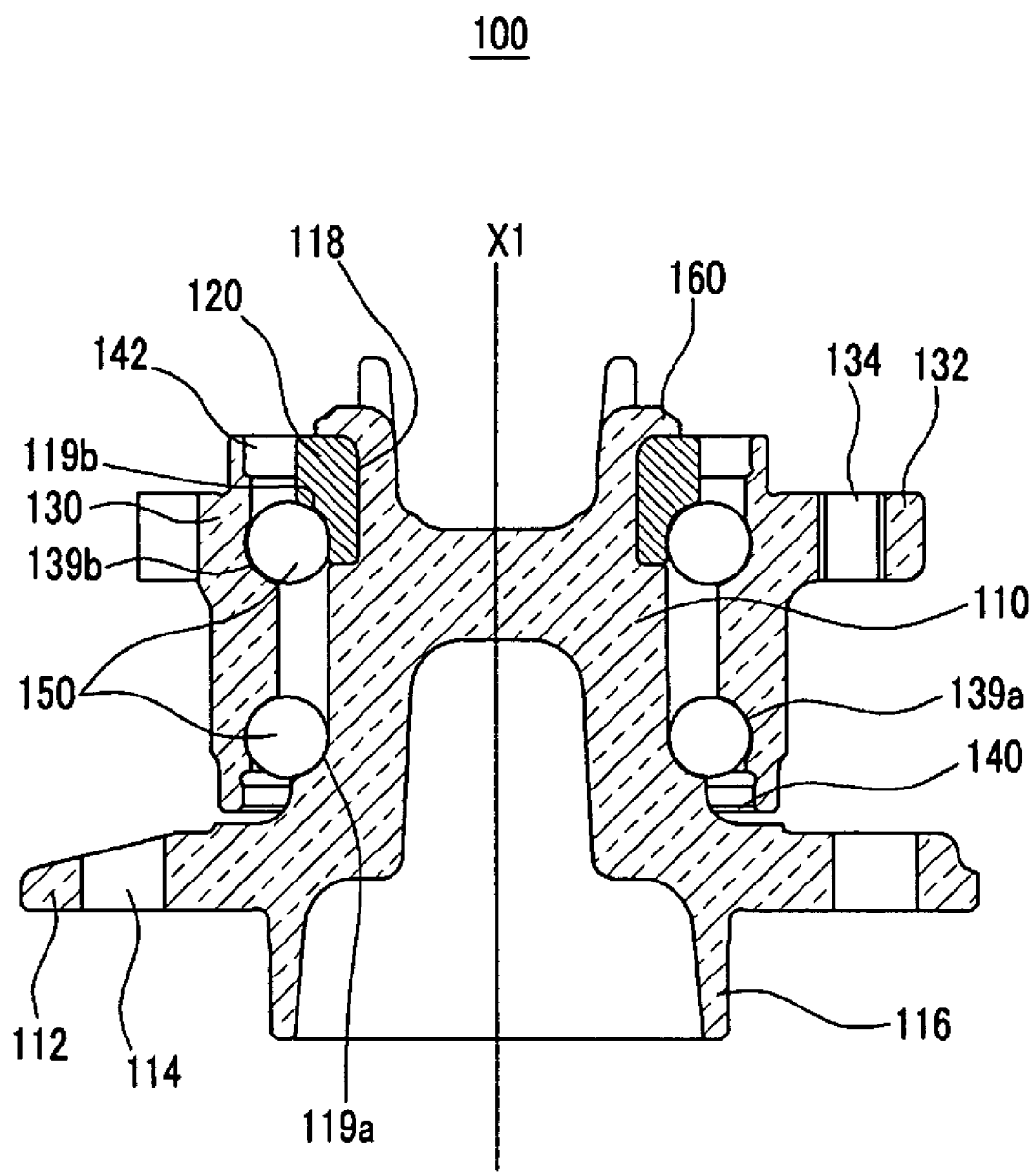
FIG. 1 is a cross-sectional view of a general wheel bearing assembly.

FIG. 1 is a cross-sectional view of a general wheel bearing assembly.

For better comprehension and ease of description, one type of the wheel bearing assembly among various types of the wheel bearing assemblies is exemplified in FIG. 1, but the spirit of the present invention can be applied not only to the wheel bearing assembly shown in FIG. 1 but also to the various types of wheel bearing assemblies. Particularly, the spirit of the present invention can be applied to any wheel bearing assemblies that include a rotatable element and a non-rotatable element and that are manufactured by orbital-forming one element toward the other element.

In addition, a driven wheel bearing assembly is exemplified in FIG. 1. However, since a driving wheel bearing assembly provided with splines formed at an inner surface of a hub such that the hub is splined to a drive shaft can be manufactured by the same method as a driven wheel bearing assembly, it is obvious that the spirit of the present invention can be applied to a driving wheel bearing assembly, while not being limited to a driven wheel bearing assembly.

As shown in FIG. 1, an exemplary wheel bearing assembly 100 includes a hub 110, an inner ring 120, an outer ring 130, and rolling elements 150. Here, rolling elements of a roller type are exemplified, but rolling elements of a taper type can be used. In addition, the number of rows of the rolling elements can be determined by a person of ordinary skill in the art according to the design scheme.

The hub 110 has a cylindrical shape, and a wheel of a vehicle (not shown) is coupled to one end of the hub 110. For this purpose, one end of the hub 110 is protruded radially outwardly and forms a first flange 112. In addition, a pilot 116 is formed at the one end of the hub 110 by being protruded in a direction of a hub axis X1. A first bolt hole 114 is bored at the first flange 112 such that the wheel of the vehicle is coupled to hub 110 by coupling means, i.e., a bolt, and the pilot 116 guides the wheel when the wheel is coupled to the hub 110. In addition, a stepped portion 118 is formed at the other end of the hub 110, and an end portion 160 is extended from the stepped portion 118. The end portion 160 is straightly extended in the direction of the hub axis X1 before orbital-forming, but is bent radially outwardly and is plastic-deformed after the orbital-forming. A first inner raceway 119a is formed between the stepped portion 118 of the hub 110 and the first flange 112.

The inner ring 120 is press-fitted to the stepped portion of the hub 110, and a second inner raceway 119b is formed on the inner ring 120.

The outer ring 130 is disposed at the radial exterior of the hub 110 and covers the hub 110. First and second outer raceways 139a and 139b respectively corresponding to the first and second inner raceways 119a and 119b are formed on an inner surface of the outer ring 130, and the outer surface of the outer ring 130 is protruded radially outwardly and forms a second flange 132. A second bolt hole 134 is bored at the second flange 132 such that the outer ring 130 is coupled to a vehicle body by coupling means, i.e., a bolt.

The rolling elements 150 are interposed between the first inner raceway 119a and the first outer raceway 139a and between the second inner raceway 119b and the second outer raceway 139b, respectively.

In addition, sealing members 140 and 142 for protecting the rolling elements 150 against undesired materials such as dust are mounted between the hub 110 and the outer ring 130 and between the inner ring 120 and the outer ring 130, respectively.

Figure 2:
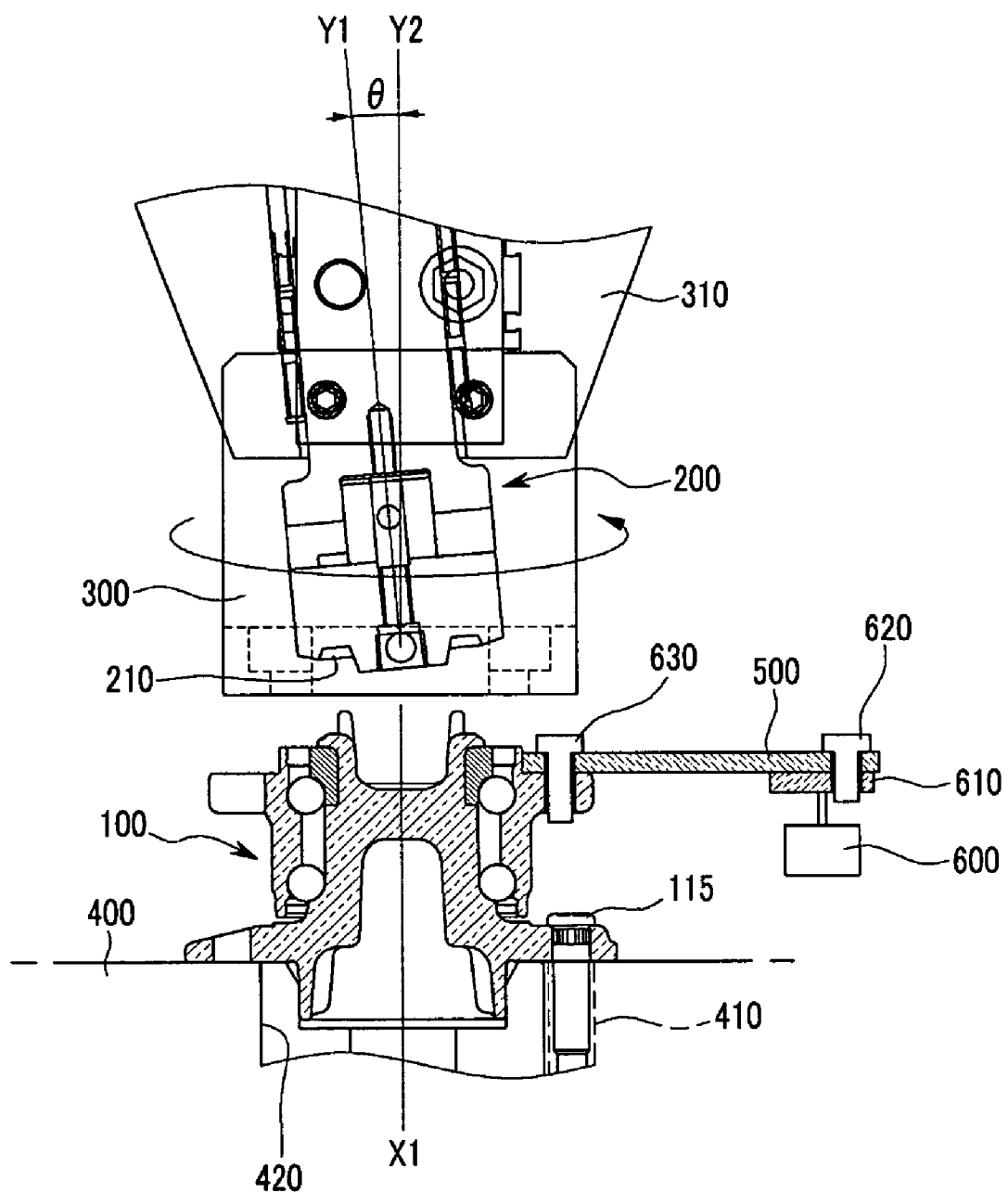
FIG. 2 is a schematic diagram of a device for manufacturing a wheel bearing assembly according to an exemplary embodiment of the present invention.

FIG. 2 is a schematic diagram of a device for manufacturing a wheel bearing assembly according to an exemplary embodiment of the present invention.

As shown in FIG. 2, a device for manufacturing a wheel bearing assembly according to an exemplary embodiment of the present invention includes a base 400, a forming tool mounting portion 310, a rotating portion, a forming tool 200, and a supporter 300.

The base 400 is disposed at a lowest position, and the wheel bearing assembly 100 is placed on the base 400. In this case, a pilot insert recess 420 is formed on the base 400, and the pilot 116 protruded in the direction of the hub axis X1 is inserted in the pilot insert recess 420 when the wheel bearing assembly 100 is placed on the base 400. In addition, a guiding hollow 410 corresponding to the first bolt hole 114 is formed next to the pilot insert recess 420. Therefore, a guiding pin 115 is inserted in the first bolt hole 114 and the guiding hollow 410 and the hub 110 is supported on the base 400 when the hub 110 is mounted on the base 400. A predetermined gap is formed between the guiding pin 115 and the guiding hollow 410 such that the hub 110 can move to the left, to the right, forward, or backward.

The forming tool mounting portion 310 is mounted above the base 310. The forming tool 200 is rotatably mounted at the forming tool mounting portion 310, and thus rotates about a first axis Y1 that is slanted with respect to the hub axis X1 by a predetermined angle. In addition, the forming tool mounting portion 310 is located such that a central axis thereof is disposed in parallel with the hub axis X1, and is preferably the same as a second axis Y2 that is extended from the hub axis X1.

Figure 3:
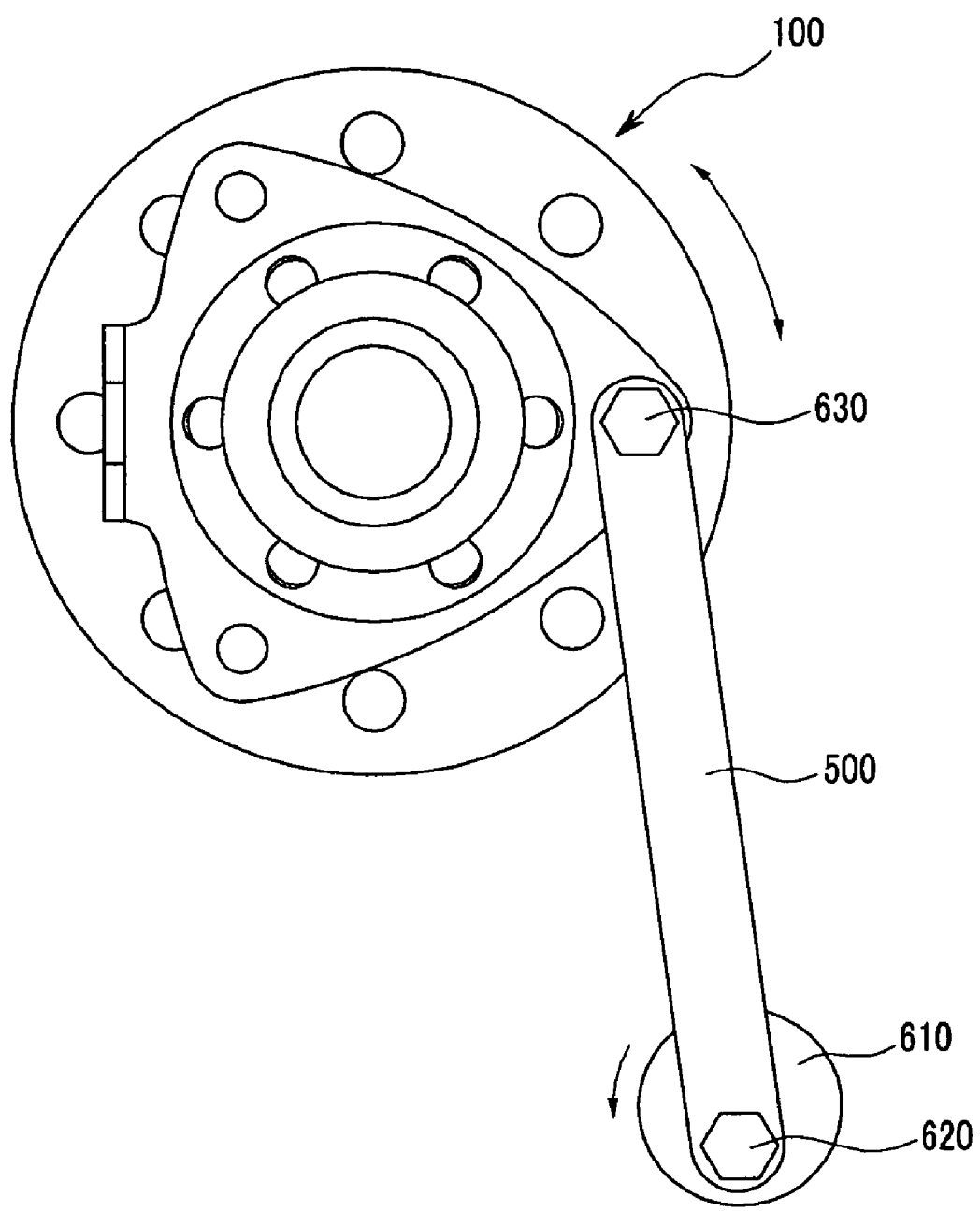
FIG. 3 is a top plan view of a wheel bearing assembly on which a rotating portion is mounted according to an exemplary embodiment of the present invention in a case that an outer ring is pivoted.
Figure 4:
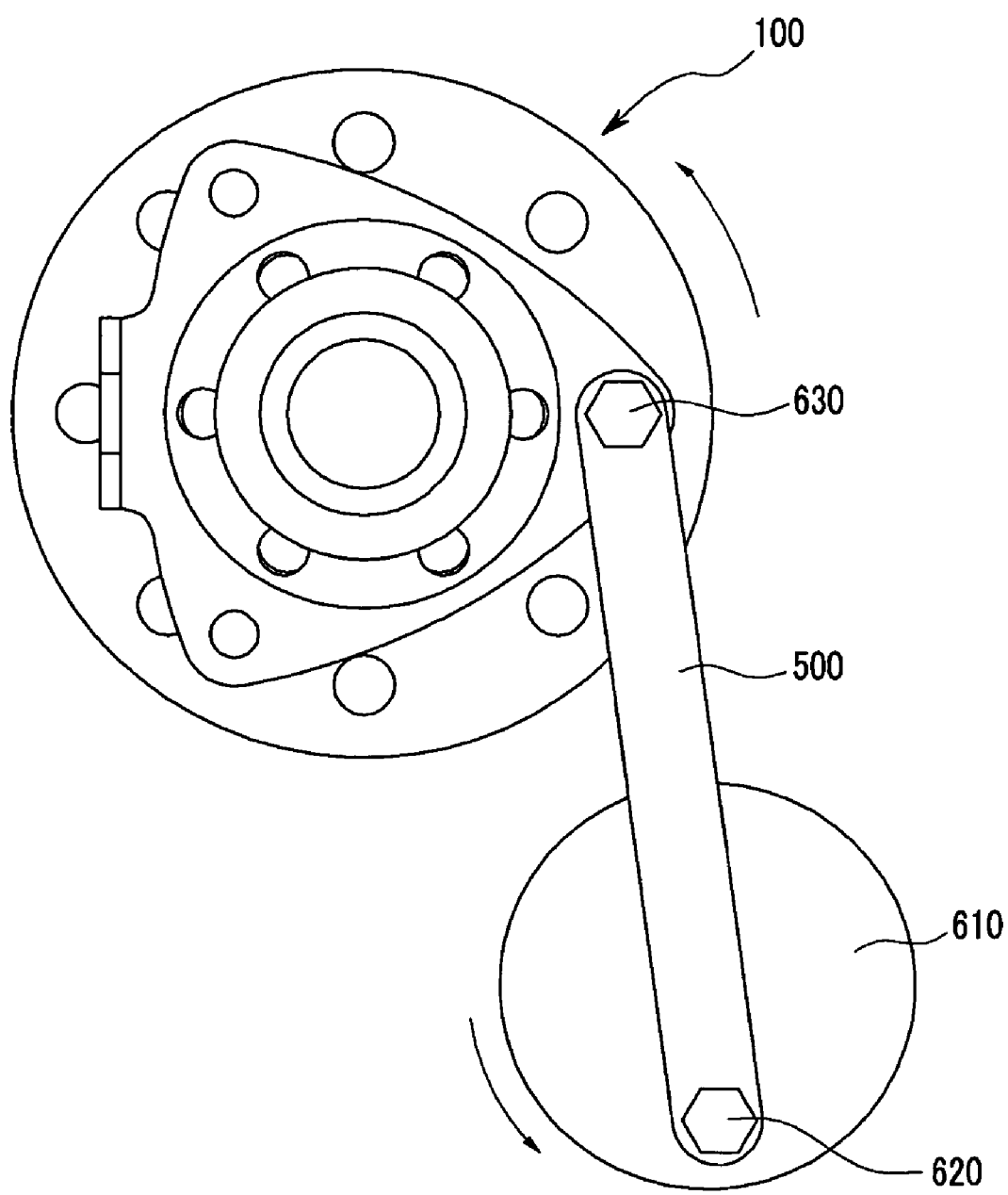
FIG. 4 is a top plan view of a wheel bearing assembly on which a rotating portion is mounted according to an exemplary embodiment of the present invention in a case that an outer ring is rotated.

The rotating portion is rotatably or pivotally connected to the outer ring 130 of the wheel bearing assembly 100, and, as shown in FIG. 2, FIG. 3, and FIG. 4, includes a driving unit 600, a rotatable plate 610, and a driving link 500.

The driving unit 600 generates torque in order to rotate or pivot the outer ring 130, and outputs the torque through a drive shaft. The driving unit 600 may be a motor.

The rotatable plate 610 has a circular shape, and is rotatably connected to the drive shaft. Therefore, the rotatable plate 610 receives torque from the driving unit 600 and rotates.

The driving link 500 is eccentrically and rotatably connected to the rotatable plate 610 by a crank pin 620. In addition, the driving link 500 is rotatably connected to the outer ring 130 by a connecting pin 630 that is inserted in the second bolt hole 134 of the outer ring 130. Therefore, as the rotatable plate 610 rotates, the driving link 500 moves along a predetermined trace and rotates or pivots the outer ring 130 about the hub axis X1 in a predetermined direction. The predetermined direction may be the same direction as the forming tool or the opposite direction according to a designer's scheme. In addition, the rotatable plate 610 may rotate repeatedly counterclockwise or clockwise. This is called oscillation. In orbital-forming, such rotational or pivotal movement of the outer ring 130 decentralizes load applied to the outer ring 130 over a wider area.

In addition, as shown in FIG. 3, the outer ring 130 pivots in a case that diameter of the rotatable plate 610 is small. On the contrary, as shown in FIG. 4, the outer ring 130 rotates in a case that the diameter of the rotatable plate 610 is large.

The forming tool 200 has a cylindrical shape, and is slantedly mounted on the forming tool mounting portion 310 at the predetermined angle. A forming groove 210 is formed at the lower end of the forming tool 200. In orbital-forming, the end portion 160 of the hub 110 is inserted in the forming groove and is bent radially outwardly toward the inner ring 120. The forming tool 200 rotates on its axis and simultaneously orbits. Here, rotation on its axis means rotation on the first axis Y1 which is the central axis of the forming tool 200, and orbiting means rotation about the second axis Y2 with reference to a point where the second axis Y2 and the first axis Y1 meet. Upper and lower ends of the forming tool 200 have circular movements having predetermined radii by orbiting. Since the forming tool 200 rotates on its axis and simultaneously orbits, a difference of rotation speed between the forming tool 200 and the end portion 160 of the hub 110 is lowered when the forming tool 200 contacts the end portion 160.

In addition, the forming tool 200 can move upwardly or downwardly within a predetermined range.

The supporter 300 is mounted at the lower portion of the forming tool mounting portion 310 and covers the forming tool 200. The supporter 300 prevents the wheel bearing assembly 100 from moving away and simultaneously prevents heat and noise from radiating in all directions in orbital-forming.

Hereinafter, manufacturing processes of the wheel bearing assembly by using the device for manufacturing a wheel bearing assembly will be described.

Firstly, the wheel bearing assembly 100 is put on the upper surface of the base 400 such that the pilot 116 of the wheel bearing assembly 100 is inserted in the pilot insert recess 420, and the guiding pin 115 is inserted in the first bolt hole 114 and the guiding hollow 410. In addition, the driving link 500 is rotatably connected to the outer ring 130 by the connect pin 630. At this state, the forming tool 200 is located on the wheel bearing assembly 100 such that the end portion 160 of the hub 110 is inserted in and contacted with the forming groove 210 of the forming tool 200.

After that, the rotating portion rotates or pivots the outer ring 130, and the forming tool 200 rotates on the first axis Y1 and orbits about the second axis Y2. At this state, a load is applied to the end portion of the hub 110 by using the forming tool 200, and the end portion 160 of the hub 100 is bent radially outwardly toward the inner ring 120 and closely contacts the inner ring 120.

At this time, since the forming tool 200 rotates on its axis and simultaneously orbits, a difference of rotation speed between the forming tool 200 and the end portion 160 is lowered when the forming tool 200 contacts the end portion 160. Therefore, impact given to the end portion 160 is reduced.

In addition, since the predetermined gap is formed between the guiding pin 410 and the guiding hollow 410, the guiding pin 410 may rotate or reciprocally move upwardly or downwardly in the guiding hollow 410 as the forming tool 200 rotates. Thereby, the hub 110 has a predetermined movement. Such predetermined movement of the hub 110 reduces stress concentrated on the rolling elements 150 in a case of the orbital-forming, and reduces impact generated when the forming tool 200 contacts with the end portion 160 of the hub 110. When the hub 110 reciprocally moves upwardly or downwardly, the forming tool 200 also undergoes reciprocal motion in a state of contacting with the hub 110.

Further, since the outer ring 130 is rotated or pivoted by the rotating portion, the stress applied to the rolling elements from the forming tool 200 through the hub 110 and the inner ring 120 is reduced. Therefore, an error rate of the wheel bearing assembly 100 is lowered.

Meanwhile, it is preferably that the rotation speed of the outer ring 130 is slower than that of the forming tool 200.

In addition, in an initial state of the orbital-forming when the end portion 160 of the hub 110 contacts the forming groove 210 of the forming tool 200, the hub 110 can move to the left, to the right, forward, backward, upward, or downward. In this case, the hub 110 does not move away from the base 400 by means of the guiding pin 115 inserted in the guiding hollow 410 and the first bolt hole 114. At this state, the forming tool 200 pushes the wheel bearing assembly 100 more strongly, movement of the hub 110 is decreased, and the wheel bearing assembly 100 is completely manufactured.

Meanwhile, the hub 110 may be fixed to the base 400 by using a fixing bolt (not shown) instead of the guiding pin 115. In this case, the wheel bearing assembly is manufactured only by rotating the outer ring 130.

If the wheel bearing assembly 100 is completely manufactured, the rotating portion 500 is decoupled from the outer ring 130 and the wheel bearing assembly 100 is uninstalled from the base 400.

Since stress concentrated on the rolling elements is reduced by rotating the outer ring, an error rate of the wheel bearing assembly may be lowered according to the present invention.

In addition, since the hub has a predetermined movement at an initial state of the orbital-forming, impact generated when the forming tool contacts an end portion of a hub is reduced. Therefore, the end portion of the hub may be prevented from being broken.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for manufacturing a wheel bearing assembly, which has a hub provided with one end engaged to a wheel of a vehicle and the other end forming a stepped portion and an end portion, an inner ring mounted on the stepped portion of the hub, an outer ring mounted at a vehicle body, and rolling elements interposed between the outer ring and the hub and the inner ring and orbital-forming the end portion of the hub radially outwardly toward the inner ring, the device comprising:
    a base, on which the hub is mounted, supporting the hub in a case of orbital-forming;
    a forming tool mounting portion mounted above the base;
    a rotating portion rotatably connected to the outer ring and rotating or pivoting the outer ring about a hub axis in a case of the orbital-forming; and
    a forming tool mounted at the forming tool mounting portion, rotating on a first axis slanted to the hub axis by a predetermined angle, and simultaneously orbiting about a second axis parallel with the hub axis.

2. The device of claim 1, wherein the forming tool has a cylindrical shape, and a central axis of the forming tool is the same as the first axis.

3. The device of claim 1, wherein a forming groove is formed at a lower end of the forming tool,
    wherein the forming groove contacts the end portion of the hub in a case of the orbital-forming so as to form the end portion of the hub radially outwardly toward the inner ring.

4. The device of claim 1, wherein the hub is provided with a flange protruded radially outwardly from one end of the hub and a bolt hole bored on the flange and engaging the wheel of the vehicle with the hub,
    wherein the base is provided with a guiding hollow corresponding to the bolt hole, and
    wherein a guiding pin is inserted in the bolt hole and the guiding hollow and guides the hub to have a predetermined movement in a case of the orbital-forming so as to reduce stress concentrated on the rolling elements.

5. The device of claim 4, wherein the predetermined movement of the hub is caused by rotation of the guiding pin in the bolt hole.

6. The device of claim 4, wherein the predetermined movement of the hub is upward or downward reciprocal motion of the hub within a predetermined range.

7. The device of claim 6, wherein, in a case that the hub moves upwardly or downwardly, the forming tool also moves upwardly or downwardly.

8. The device of claim 1, wherein the rotating portion comprises:
    a driving unit generating torque;
    a rotatable plate connected to and rotated by the driving unit; and
    a driving link eccentrically connected to the rotatable plate, and rotatably connected to the rotatable plate and the outer ring so as to rotate or pivot the outer ring about the hub axis according to rotation of the rotatable plate.

* * * * *